March 4, 1930. V. T. SCHMITT 1,749,194
WATER COOLER
Filed April 15, 1929 2 Sheets-Sheet 2
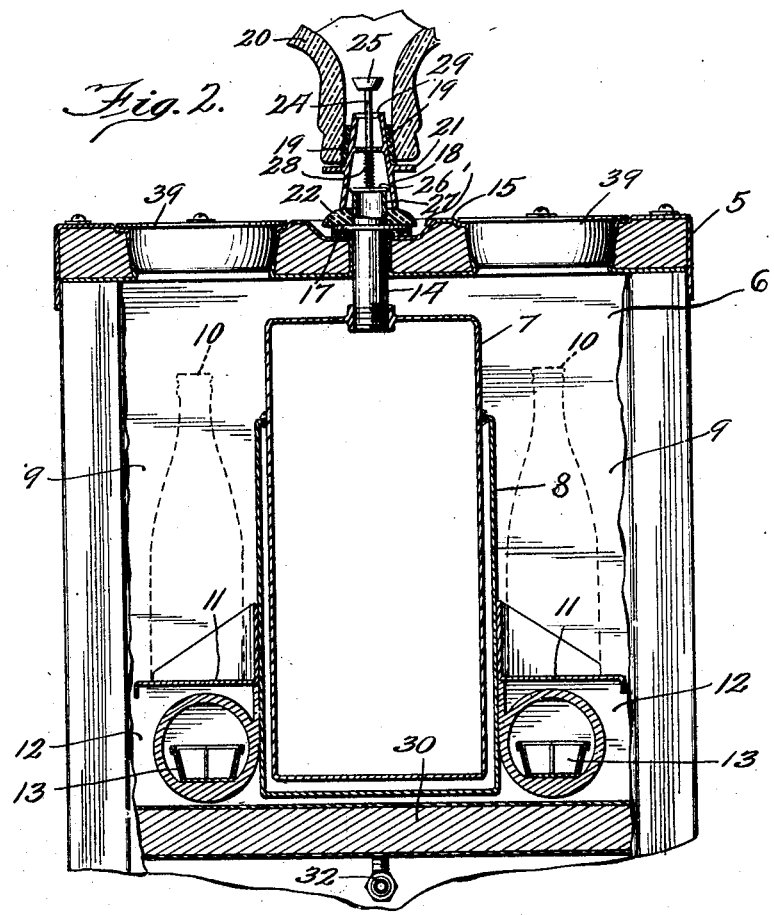
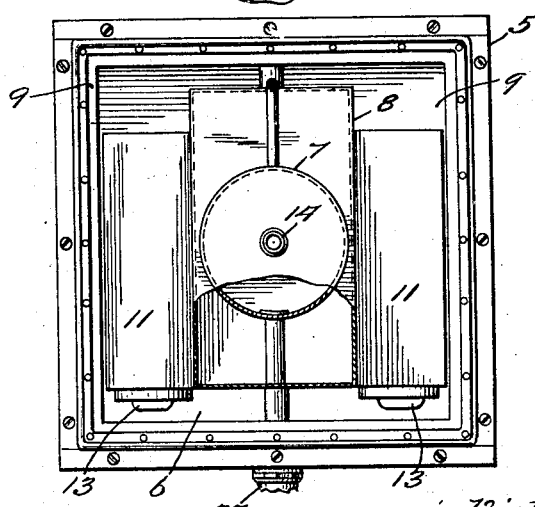
Inventor:
Victor T. Schmitt
By Cheever, Cox & Moore
Attys Patented Mar. 4, 1930

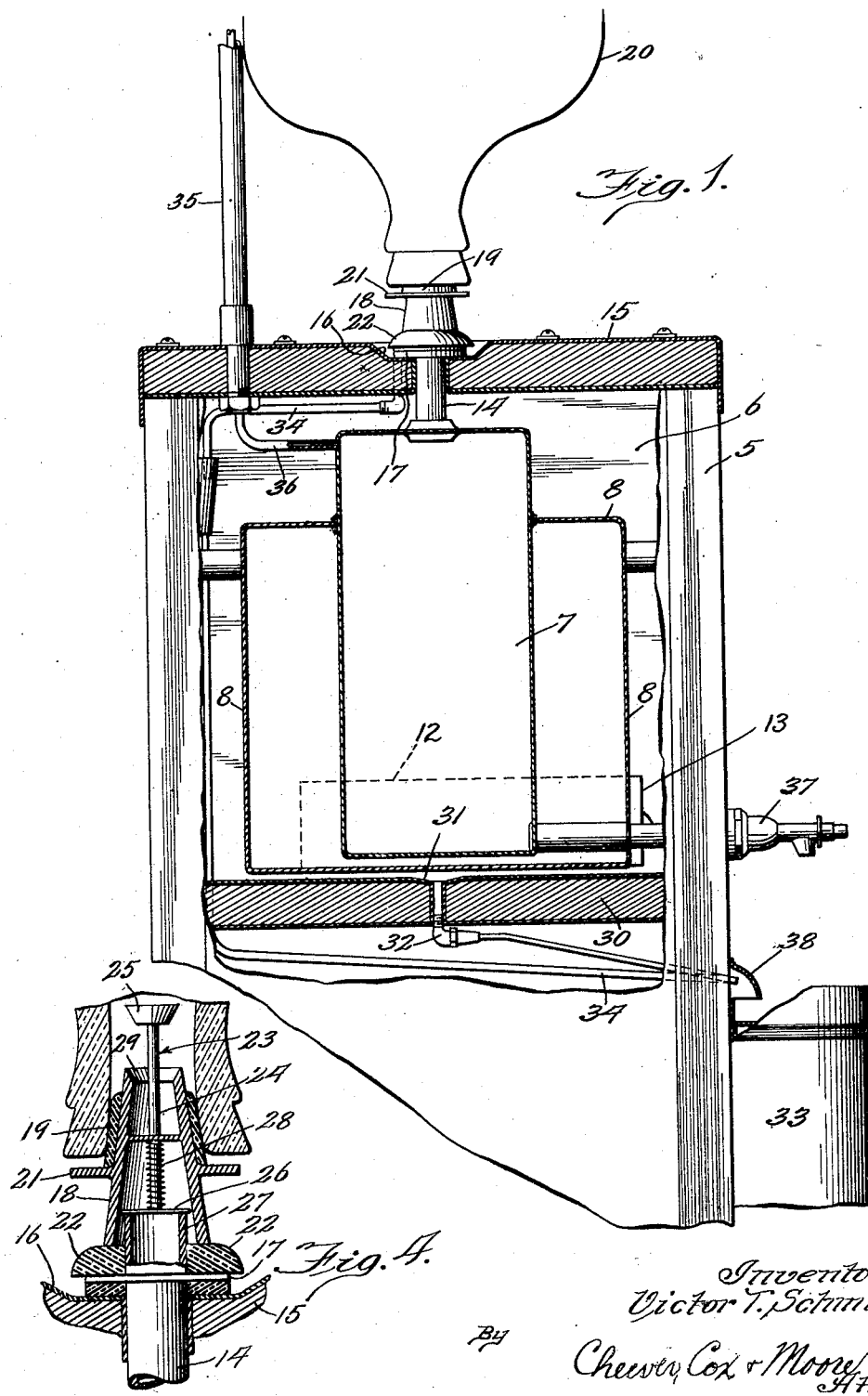

1,749,194

UNITED STATES PATENT OFFICE

VICTOR T. SCHMITT, OF CHICAGO, ILLINOIS, ASSIGNOR TO HINCKLEY & SCHMITT, OF CHICAGO, ILLINOIS, A CORPORATION OF ILLINOIS

WATER COOLER

Application filed April 15, 1929. Serial No. 355,255.

This invention relates to water coolers in general, and particularly to that type of coolers in which the cooling medium is of the mechanical or circulating type.

The object of the invention is to provide a water cooler which is exceedingly efficient in operation, which is small and compact in construction, and which can be quickly and economically manufactured and assembled.

Another object is to provide a water cooler which has a cooling tank of relatively large area so that the fluid therein may be quickly cooled and maintained at a normally even temperature.

Another object is to provide a water cooler which is provided with a plurality of additional cooling compartments or chambers which are accessible from the outside of the cooler.

A further object is to provide a water cooler which has a relatively large water storage tank which is cooled by means of a mechanical or circulating refrigerating system whereby space may be preserved or provided within the refrigerating chamber for the reception of articles to be cooled and for the reception of ice trays or pans for manufacturing ice cubes.

A still further object is to provide new and novel valve means for establishing communication between the storage tank and the main fluid or water supply.

Other objects and advantages will hereinafter appear.

The invention comprises in general a casing in which a refrigerating chamber is arranged for cooling the water storage tank. A main water supply or bottle is arranged above the casing and has communication with the storage tank whereby a relatively large quantity of water is maintained in contact with the cooling medium so that during ordinary use, the water in the tank will be kept at a substantially even temperature. A cooling medium, which in this instance is shown as being a brine circulating system, is arranged partially about the water storage tank, and a plurality of compartments is arranged adjacent the cooling medium for the reception of bottles or other articles which are cooled by the cooling medium and which are independent of the water storage tank. A plurality of smaller compartments is preferably arranged below the bottle compartments, and these latter compartments contain drawers or trays for making ice cubes, if desired.

The accompanying drawings illustrate a selected embodiment of the invention and the views therein are as follows:

Fig. 1 is a detail vertical sectional view through the water cooler;

Fig. 2 is a similar view taken at right angles to Fig. 1;

Fig. 3 is a sectional plan view, and

Fig. 4 is a detail sectional view showing the valve mechanism which connects the water supply with the water storage tank.

Referring to the drawings, 5 designates a casing provided with a refrigerating chamber 6. A water storage tank 7 is arranged within the refrigerating chamber and is partially encased by the brine circulating tank or other cooling means 8. A pair of compartments 9, Fig. 2, is provided in the refrigerating chamber adjacent the tank 7 for the reception of bottles 10 or other articles to be cooled. Shelves 11 are arranged in the lower part of the compartment 9 to support the bottles or other articles which may be placed in the compartments. A second pair of compartments 12 is arranged below the shelves 11 for the reception of trays or pans 13 whereby ice cubes may be made in the usual and conventional manner. A pipe 14 is connected to the upper part of the tank 7 and extends through the top wall 15 of the casing 5. This top may be dished at 16 to support the flange 17 on the pipe 14 and also for the purpose of collecting any water or other fluid which may be spilled on the top of the casing.

A tubular connecting member 18 carrying a rubber gasket 19 is adapted to be inserted into the mouth of a water bottle 20. A flange 21 is arranged on the tubular member 18 to support the gasket 19 which extends inwardly of the bottle.

Another gasket or washer 22 is arranged about the upper end of the pipe 14 and seats on the annular flange 17. This gasket provides a yieldable support or bearing for the tubular member 18 and the bottle 20 to which it is attached.

A valve 23 having a valve stem 24 is provided with a valve disk 25 at its upper end and it has a crossbar 26 at its lower end which is adapted to contact with the upper end 27 of the pipe 14. The valve stem 24 is made of such a length that when the tubular member is applied to the pipe 14 the valve 23 will be lifted by the upper end 27 of the pipe and thereby permit free passage of the liquid from the bottle through the pipe 14 into the tank 7. A spring 28 may be arranged about the valve stem 14 for normally holding the valve disk 25 against its seat 29 so that none of the liquid in the bottle will spill when the bottle is in inverted position and being set in place on the cooler.

A bottom member 30 is arranged in the casing 5 and below the refrigerating chamber to separate the refrigerating chamber from the apparatus which cools the solution in the brine tank 8. This bottom member 30 is provided with a dished surface 31, Fig. 1, which communicates with a pipe line 32 for draining the condensation from the refrigerating chamber to the drip pan or receptacle 33.

A pipe line 34 communicates with the dished surface 16 in the top 15, and leads to the receptacle 33 for draining away any water or condensation which may be collected in the dished surface 16.

A vertical standard 35 is secured to the top of the casing and carries securing means (not shown) for maintaining the bottle 20 in proper relative position.

A vent 36 communicates with the storage tank 7 and extends upwardly within the standard 35 so that the water will flow readily and quietly when the faucet 37, which communicates with the bottom of the tank 7, is operated. The faucet 37 is arranged immediately above the receptacle 33 so that any water which is spilled or which may drip from the faucet will be caught in the receptacle.

The vent 36 need not extend upwardly as far as the water level in the bottle as the water level in the vent 34 will only extend a part of the way to the water level in the bottle inasmuch as the water pressure and the atmospheric pressure in the vent will balance the column of water in the bottle plus the reduced air pressure therein.

A baffle 38 is arranged on the side of the casing 5 and extends over the outlet ends of the pipes 32 and 34 to prevent them from becoming damaged or filling up with foreign material.

A pair of removable doors or covers 39 may be arranged in the top 15 to permit access to the compartments 9.

In practice, the faucet 37 is operated and the pressure in the bottle will be reduced as the air enters the tank through the vent 34 to take the place of the liquid which is withdrawn. This air then displaces the water standing in the vent, forcing it down into the vent before the air can gain access to the bottle mouth; after the faucet is closed the water again rises in the vent to the level determined by the difference between the then existing air pressures in the vent and bottle.

The invention provides a water cooler which is provided with new and novel means for providing refrigerated or cooled compartments, and also providing means for making ice cubes if and when desired.

Changes may be made in the form, construction, and arrangement of the parts without departing from the spirit of the invention or sacrificing any of the advantages thereof, and the right is hereby reserved to make all such changes as fairly follow within the scope of the following claims.

The invention is hereby claimed as follows:

1. In combination a water cooler comprising a casing, a water storage tank in said casing, a pipe extending vertically through said casing, supply means arranged outside of said casing, a washer arranged about said pipe, a valve casing having its lower end resting on said washer, a normally closed spring-pressed valve in said casing for establishing communication between said tank and said supply, and means for maintaining said valve in open position when the supply means and tank are in proper operating position.

2. A water cooler having a cylindrical storage tank with means for supplying drinking water thereto and controllably withdrawing it therefrom, an approximately square casing within which said storage tank is enclosed, and a brine tank laterally surrounding the storage tank within the casing, said brine tank being rectangular and of much greater length than the diameter of the storage tank and of only slightly greater width, whereby spaces are left between the sides of the brine tank and the inside of the casing for the storage of bottles and the like.

3. A water cooler having a cylindrical storage tank with means for supplying drinking water thereto and controllably withdrawing it therefrom, an approximately square casing within which said storage tank is enclosed, a brine tank laterally surrounding the storage tank within the casing, said brine tank being rectangular and of much greater length than the diameter of the storage tank and of only slightly greater width, whereby spaces are left between the sides of the brine tank and the inside of the casing for the storage of bottles and the like, and shelves arranged in said last named spaces and providing separate compartments for the reception of ice trays and the like.

In witness whereof, I have hereunto subscribed my name.

VICTOR T. SCHMITT.